United States Patent
Deng et al.

(10) Patent No.: US 11,954,787 B2
(45) Date of Patent: Apr. 9, 2024

(54) IMAGE RENDERING METHOD IN PANORAMIC APPLICATION AND TERMINAL DEVICE

(71) Applicant: HUAWEI TECHNOLOGIES CO., LTD., Guangdong (CN)

(72) Inventors: Yixin Deng, Nanjing (CN); Qichao Zhu, Hangzhou (CN); Dong Wei, Shenzhen (CN); Lei Yang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 17/850,170

(22) Filed: Jun. 27, 2022

(65) Prior Publication Data

US 2022/0327758 A1    Oct. 13, 2022

Related U.S. Application Data

(63) Continuation of application No. PCT/CN2020/113216, filed on Sep. 3, 2020.

(30) Foreign Application Priority Data

Dec. 27, 2019    (CN) .......................... 201911403810.0

(51) Int. Cl.
    *G06T 15/00*    (2011.01)
(52) U.S. Cl.
    CPC ................................ *G06T 15/005* (2013.01)
(58) Field of Classification Search
    CPC ................................................... G06T 19/006
    See application file for complete search history.

(56) References Cited

U.S. PATENT DOCUMENTS

| 2004/0075654 | A1 | 4/2004 | Hsiao et al. |
| 2013/0016097 | A1* | 1/2013 | Coene ................ G06T 15/205 |
| | | | 345/419 |
| 2021/0166467 | A1* | 6/2021 | Zhang ................ G06T 15/503 |

FOREIGN PATENT DOCUMENTS

| CN | 107484036 A | 12/2017 |
| CN | 107807732 A | 3/2018 |
| CN | 109242943 A | 1/2019 |
| CN | 109461199 A | 3/2019 |
| CN | 109542574 A | 3/2019 |
| CN | 109741414 A | 5/2019 |
| CN | 109741465 A | 5/2019 |

OTHER PUBLICATIONS

International Search Report and Written Opinion in International Appln. No. PCT/CN2020/113216, dated Dec. 7, 2020, 14 pages (with English translation).

* cited by examiner

*Primary Examiner* — Shivang I Patel
(74) *Attorney, Agent, or Firm* — Fish & Richardson P.C.

(57) ABSTRACT

The disclosure provides image rendering methods and apparatuses. One example method includes that a foreground image is first rendered, and then a panoramic image used as a background is rendered. A pixel corresponding to the foreground image has a corresponding depth value. When the panoramic image is rendered, content corresponding to the panoramic image may be rendered at a pixel corresponding to a depth standard value based on a depth value of a pixel on a canvas. The depth reference value is a depth value of a pixel other than the pixel corresponding to the foreground image.

17 Claims, 7 Drawing Sheets

IMAGE RENDERING METHOD IN PANORAMIC APPLICATION AND TERMINAL DEVICE

CROSS-REFERENCE TO RELATED APPLICATIONS

This application is a continuation of International Application No. PCT/CN2020/113216, filed on Sep. 3, 2020, which claims priority to Chinese Patent Application No. 201911403810.0, filed on Dec. 27, 2019. The disclosures of the aforementioned applications are hereby incorporated by reference in their entireties.

TECHNICAL FIELD

This application relates to the field of image processing technologies, and in particular, to an image rendering method in a panoramic application and a terminal device.

BACKGROUND

A panoramic image has advantages of strong sense of reality, large amounts of information, and good interaction, which may bring a user a feeling of immersiveness. Therefore, the panoramic image is widely used in many fields, for example, panoramic car viewing, panoramic room viewing, panoramic hotel experience, street view of a map, and artificial intelligence (artificial intelligence, AI) video background replacement in a video chat.

These panoramic applications do not merely display a panoramic image, but superimpose one or more foreground elements on the panoramic image. The foreground element may be a person image, a ground mark, another image, or the like. In a panoramic application, a panoramic image is usually a background. To superimpose a foreground image on the panoramic image, a layer principle is currently used.

During rendering of a frame of background image and foreground image based on the layer principle, the background image is first rendered. Color information of each pixel of the background image is filled into a display buffer, and then color information of a pixel corresponding to the foreground image is filled into the display buffer. The color information of the pixel of the foreground image covers color information of a pixel in an overlapping part between the background image and the foreground image. It can be learned that the overlapping part needs to be rendered repeatedly, resulting in very high rendering overheads.

SUMMARY

Embodiments of this application provide an image rendering method in a panoramic application, to reduce rendering overheads, and avoid resource wastes caused by repeated rendering. The embodiments of this application further provide a corresponding terminal device.

A first aspect of this application provides an image rendering method in a panoramic application. The panoramic application may include panoramic car viewing, panoramic room viewing, panoramic hotel experience, street view of a map, artificial intelligence (artificial intelligence, AI) video background replacement in a video chat, and another application applied to a panoramic image. The method includes: in response to an operation on the panoramic application, obtaining a foreground image and a panoramic image, where the panoramic image is a background image of the foreground image; rendering the foreground image, and setting a depth value of each pixel on a canvas, where the depth value of each pixel includes a first depth value and a depth reference value, the first depth value is a depth value of a pixel (pixel) corresponding to the foreground image, the depth reference value is a depth value of a pixel other than the pixel corresponding to the foreground image, the canvas is an area that is on a screen of a terminal device and that is used to display the panoramic image and the foreground image, and it should be understood that the canvas may refer to a part of a display area of the screen or refer to an entire display area of the screen; and rendering, at a first pixel based on the first depth value and the depth reference value, a color value that corresponds to the first pixel and that is on the panoramic image, where the first pixel is a pixel corresponding to the depth reference value.

In the first aspect, the foreground image may be a person, a ground mark, or another image different from the background image. The background image may alternatively be a non-panoramic image, and a size of the background image is greater than a size of the foreground image. For a canvas, a quantity of pixels included on the canvas is fixed. Pixels on the canvas may be considered as a pixel set A, a set of pixels occupied by the foreground image may be described as a subset B, and a set of pixels remaining after the subset B is removed may be described as a subset C. The pixels of the subset B and the pixels of the subset C do not overlap, and subset B+subset C=set A. For ease of description, the "first depth value" represents the depth value of the pixel corresponding to the foreground image, the depth reference value is a reference value, and the first depth value and the depth reference value are separately used to represent different statuses of a pixel. The first depth value is used to indicate that the corresponding pixel does not need to be repeatedly rendered, and the depth reference value indicates that the corresponding pixel is not rendered. The first depth value may be represented by a specific numerical value, for example, −0.5, and the depth reference value may be represented by 0, or certainly, other numerical values may be used. In addition, the first depth value and the depth reference value in this application are not limited to numerical values, and may be other characters that can indicate whether pixels need to be rendered. For example, T indicates that repeated rendering is not required, and F indicates that the pixel is not rendered. Certainly, other characters may also be used for representation, as long as an indication is clear. The depth value does not represent a specific physical concept. Another name may be used for description, as long as it can describe whether a pixel can be rendered based on the panoramic image. If the depth reference value is 0, it may alternatively be understood as that an operation of clearing a depth value of a pixel on the canvas is performed each time before the foreground image is rendered, and then the first depth value of the foreground image is written into a corresponding pixel of the foreground image when the foreground image is rendered. If the depth reference value is not 0, it may alternatively be understood as that a unified assignment operation is performed on the depth value of the pixel on the canvas each time before the foreground image is rendered, the depth value of the pixel on the canvas is first assigned the depth reference value, and then when the foreground image is rendered, the depth reference value is modified to the first depth value at the corresponding pixel of the foreground image. It can be learned from the first aspect that, the foreground image is first rendered, and then corresponding content of the panoramic image is rendered for a pixel that is not occupied by the foreground image. In this way, repeated rendering is avoided for an overlapping part between the foreground image and the panoramic image, which not only reduces resource wastes and rendering overheads, but also improves rendering efficiency.

In a possible implementation of the first aspect, the foregoing step of rendering, at a first pixel based on the first depth value and the depth reference value, a color value that corresponds to the first pixel and that is on the panoramic image includes: if a depth value of a second pixel is the first depth value, stop rendering, at the second pixel, a color value that corresponds to the second pixel and that is on the panoramic image, where the second pixel is any pixel on the canvas; and if the depth value of the second pixel is the depth reference value, rendering, at the second pixel, the color value that corresponds to the second pixel and that is on the panoramic image.

In this possible implementation, after rendering of the foreground image is completed, the panoramic image begins to be rendered. The panoramic image may be rendered in a pixel-by-pixel rendering manner, and a rendered pixel may be represented by "a second pixel". If a depth value of the second pixel is the first depth value, it indicates that the second pixel is already occupied by the foreground image, and rendering does not need to be repeated. Then, rendering of the second pixel is stopped. If the depth value of the second pixel is the depth reference value, it indicates that the second pixel is not occupied by the foreground image. Then, rendering is performed based on content that is of the panoramic image and that corresponds to the second pixel. In this possible implementation, the first depth value and the depth reference value indicate whether a pixel needs to be rendered, which may ensure that a pixel occupied by the foreground image is not to be repeatedly rendered based on the panoramic image, ensuring rendering accuracy.

In a possible implementation of the first aspect, the foregoing step of rendering, at a first pixel based on the first depth value and the depth reference value, a color value that corresponds to the first pixel and that is on the panoramic image includes: if a depth value of a second pixel is less than a second depth value, stopping rendering, at the second pixel, a color value that corresponds to the second pixel and that is on the panoramic image, where the second depth value is greater than the first depth value and less than the depth reference value, and the second pixel is any pixel on the canvas; and if the depth value of the second pixel is greater than the second depth value, rendering, at the second pixel, the color value that corresponds to the second pixel and that is on the panoramic image.

In this possible implementation, the "second depth value" represents a depth value of the panoramic image, and the first depth value is relative to the second depth value. Because the panoramic image is the background image of the foreground image, the second depth value is greater than the first depth value. Both the first depth value and the second depth value are less than the depth reference value, and the first depth value, the second depth value, and the depth reference value are usually preconfigured. The panoramic image may be rendered in a pixel-by-pixel rendering manner, and a rendered pixel may be represented by "a second pixel". If a depth value of the second pixel is less than the second depth value, it indicates that the second pixel is already occupied by the foreground image, and rendering does not need to be repeated. Then, rendering of the second pixel is stopped. If the depth value of the second pixel is greater than the second depth value, it indicates that the second pixel is not occupied by the foreground image. Then, rendering is performed based on content that is of the panoramic image and that corresponds to the second pixel. In this possible implementation, the first depth value, the depth reference value, and the second depth value are compared to determine whether the second pixel needs to be rendered, which may ensure that a pixel occupied by the foreground image is not to be repeatedly rendered based on the panoramic image, ensuring rendering accuracy.

In a possible implementation of the first aspect, the method further includes: comparing the depth value of the second pixel with the second depth value by using a vertex shader, where the second depth value is configured in the vertex shader.

In this possible implementation, a graphics processing unit (graphics processing unit, GPU) usually includes a vertex shader (vertex shader) and a fragment shader (fragment shader). The vertex shader is usually configured to locate a pixel, and the fragment shader is configured to color, that is, to write a color value into a color buffer. The second depth value is configured in the vertex shader. The second depth value may be compared with the depth value of the second pixel when the pixel is located, to determine whether the second pixel needs to be rendered based on the panoramic image.

In a possible implementation of the first aspect, the foregoing step of rendering the foreground image, and setting a depth value of each pixel on a canvas includes: detecting a transparency value of an alpha channel of the pixel corresponding to the foreground image, where the transparency value is used to indicate a transparency degree of the pixel; and if the transparency value is not 0, writing a color value of the foreground image into a first location in a color buffer, and writing the first depth value into a second location in a depth buffer, where the first location is a location of a pixel that corresponds to the foreground image and that is in the color buffer, and the second location is a location of a pixel that corresponds to the foreground image and that is in the depth buffer.

In this possible implementation, a display buffer (frame buffer) related to rendering may be divided into a color buffer and a depth buffer. The color buffer is used to buffer a color value of a pixel on the canvas, and the depth buffer is used to buffer a depth value of the pixel on the canvas, for example, buffer the first depth value, the depth reference value, or the second depth value. Each pixel has an alpha channel. The alpha channel has 256 levels of color values ranging from 0 to 255, where 0 indicates that a transparency value is 0. To be specific, the pixel needs to remain transparent in the foreground image and does not need to be rendered. Other non-zero transparency values ranging from 1 to 255 indicate that rendering needs to be performed based on a color value of the foreground image. When the foreground image is rendered, a depth value of a pixel in the depth buffer is the depth reference value. If a transparency value is 0, it indicates that the pixel needs to remain transparent in the foreground image. In this case, the panoramic image needs to be used for filling, and the depth value of the pixel in the depth buffer does not need to be modified. If the transparency value is not 0, it indicates that the pixel needs to be filled by a color in the foreground image, and the panoramic image does not need to be used for filling. In this case, the depth value of the pixel in the depth buffer needs to be modified from the depth reference value to the first depth value, for example, modified from 0 to −0.5.

In a possible implementation of the first aspect, the method further includes: if the transparency value is 0, stopping an operation of writing the color value into the color buffer.

In this possible implementation, if the transparency value is 0, it indicates that the color value of the foreground image does not need to be written into the color buffer, and color value writing is usually performed by the fragment shader. In this case, when the transparency value is 0, only the fragment shader needs to be stopped from writing the color value of the pixel.

In a possible implementation of the first aspect, the foregoing step of writing the first depth value into a second location in a depth buffer includes: writing the first depth value into the second location in the depth buffer by using a fragment shader, where the first depth value is configured in the fragment shader.

In this possible implementation, the first depth value is configured in the fragment shader. In a coloring process, if it is determined by determining a color value that the depth reference value in the depth buffer needs to be modified to the first depth value, writing may be performed based on the first depth value configured in the fragment shader, to improve efficiency of writing the first depth value.

In a possible implementation of the first aspect, the method further includes: obtaining a rendering location of the foreground image in response to a location selection operation on the foreground image; and determining, based on the rendering location, the pixel corresponding to the foreground image.

In this possible implementation, a user may flexibly place an overlapping location of the foreground image in the panoramic image based on a requirement. After the user selects a location, a terminal device determines, based on the location selected by the user, a pixel that corresponds to the foreground image and that is on the canvas. Then, rendering is performed. In this way, rendering efficiency is improved.

A second aspect of this application provides a terminal device. The terminal device has functions of implementing the method in any one of the first aspect or the possible implementations of the first aspect. The function may be implemented by hardware, or may be implemented by hardware executing corresponding software. The hardware or software includes one or more modules corresponding to the foregoing functions, for example, an input unit and a processing unit.

A third aspect of this application provides a terminal device. The terminal device includes at least one central processing unit (central processing unit, CPU), a GPU, a memory, a transceiver, and computer-executable instructions that are stored in the memory and that may be run on the central processing unit. When the computer-executable instructions are executed by the central processing unit, the central processing unit and the GPU perform the method according to any one of the first aspect or the possible implementations of the first aspect.

A fourth aspect of this application provides a computer-readable storage medium storing one or more computer-executable instructions. When the computer-executable instructions are executed by a processor, the processor performs the method according to any one of the first aspect or the possible implementations of the first aspect.

A fifth aspect of this application provides a computer program product (or referred to as a computer program) that stores one or more computer-executable instructions. When the computer-executable instructions are executed by the central processing unit, the central processing unit and a GPU perform the method according to any one of the first aspect or the possible implementations of the first aspect.

A sixth aspect of this application provides a chip system. The chip system includes a central processing unit and a GPU, and is configured to support a terminal device to implement the functions in any one of the first aspect or the possible implementations of the first aspect. In a possible design, the chip system further includes a memory. The memory is configured to store program instructions and data that are necessary for the terminal device. The chip system may include a chip, or may include a chip and another discrete component.

For technical effects brought by any one of the second aspect to the fifth aspect or the possible implementations of the second aspect to the sixth aspect, refer to technical effects brought by the first aspect or the different possible implementations of the first aspect. Details are not described herein again.

In embodiments of this application, the foreground image is first rendered, and then corresponding content of the panoramic image is rendered for a pixel that is not occupied by the foreground image. In this way, repeated rendering is avoided for an overlapping part between the foreground image and the panoramic image, which not only reduces resource wastes and rendering overheads, but also improves rendering efficiency.

DESCRIPTION OF EMBODIMENTS

The following describes embodiments of this application with reference to accompanying drawings. It is clear that the described embodiments are merely some rather than all of the embodiments of this application. A person of ordinary skill in the art may learn that the technical solutions provided in embodiments of this application are also applicable to a similar technical problem as a technology evolves and a new scenario emerges.

In the specification, claims, and the accompanying drawings of this application, the terms "first", "second", and the like are intended to distinguish similar objects but do not necessarily indicate a specific order or sequence. It should be understood that data termed in such a way is interchangeable in proper circumstances, so that the embodiments described herein can be implemented in other orders than the order illustrated or described herein. In addition, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

Embodiments of this application provide an image rendering method, to reduce rendering overheads, and avoid resource wastes caused by repeated rendering. The embodiments of this application further provide a corresponding terminal device. Details are separately described below.

A panoramic application related to the embodiments of this application may include panoramic car viewing, panoramic room viewing, panoramic hotel experience, street view of a map, artificial intelligence (artificial intelligence, AI) video background replacement in a video chat, and another application applied to a panoramic image.

Figure 1:
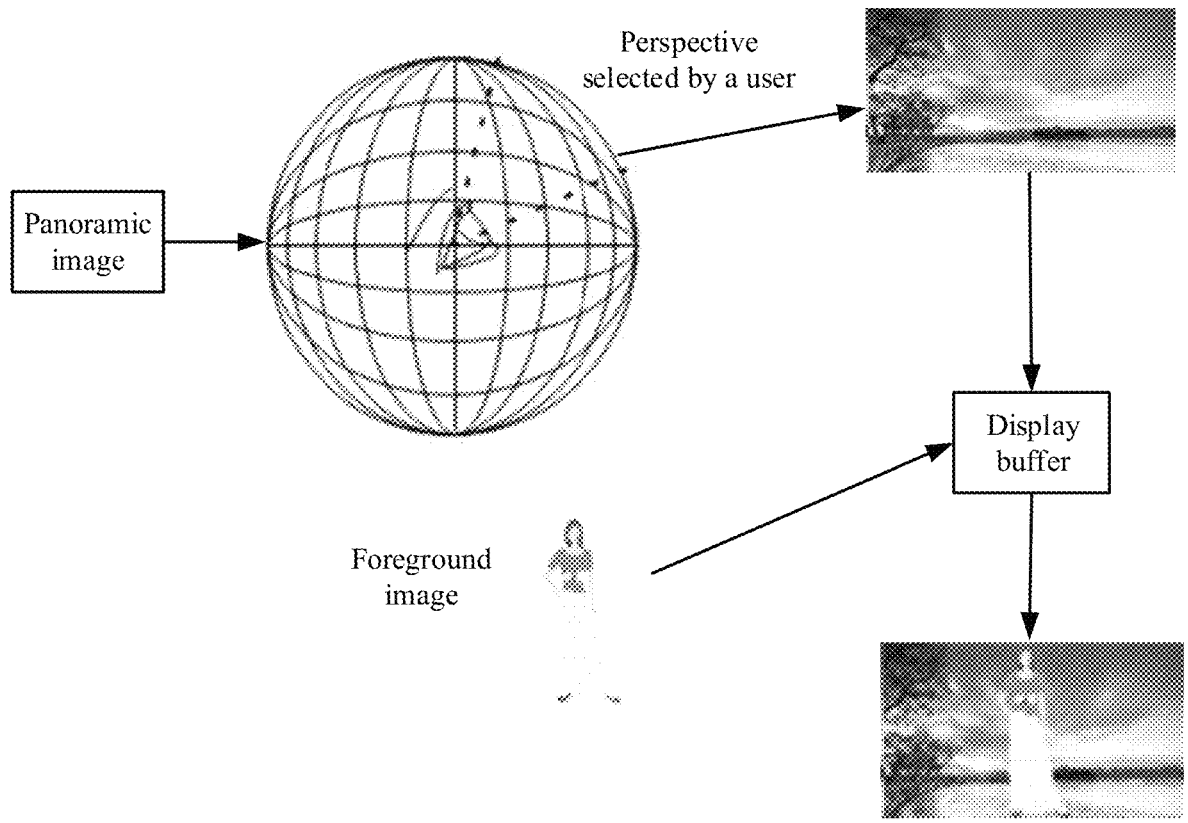
FIG. 1 is a schematic diagram of a scenario of a panoramic application according to an embodiment of this application.

FIG. 1 is a schematic diagram of a scenario of a panoramic application.

As shown in FIG. 1, in the panoramic application, a panoramic image and a foreground image are used. A person is used as an example for the foreground image, and a landscape image is used as an example for the panoramic image. A user or a program developer needs to superimpose the foreground image into the panoramic image. An operation performed by the user on the panoramic application by using a terminal device such as a mobile phone is used as an example. The user opens the panoramic application on the mobile phone, selects a panoramic image, and may determine, through perspective selection, a part to be selected. Then, the mobile phone renders a foreground image to a display buffer, and then renders the panoramic image determined through perspective selection into the display buffer, to superimpose the foreground image and the panoramic image.

In the description of the example in FIG. 1, the mobile phone is only used as an example. Actually, a terminal device on which the panoramic application is loaded is not limited to the mobile phone, and may alternatively be a tablet computer (pad), a computer (personal computer, PC), a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

In the foregoing example in FIG. 1, the foreground image is rendered first, and then the panoramic image is rendered. A pixel occupied by the foreground image is not repeatedly rendered when the panoramic image is rendered. For an embodiment of this process, refer to FIG. 2 for understanding.

Figure 2:
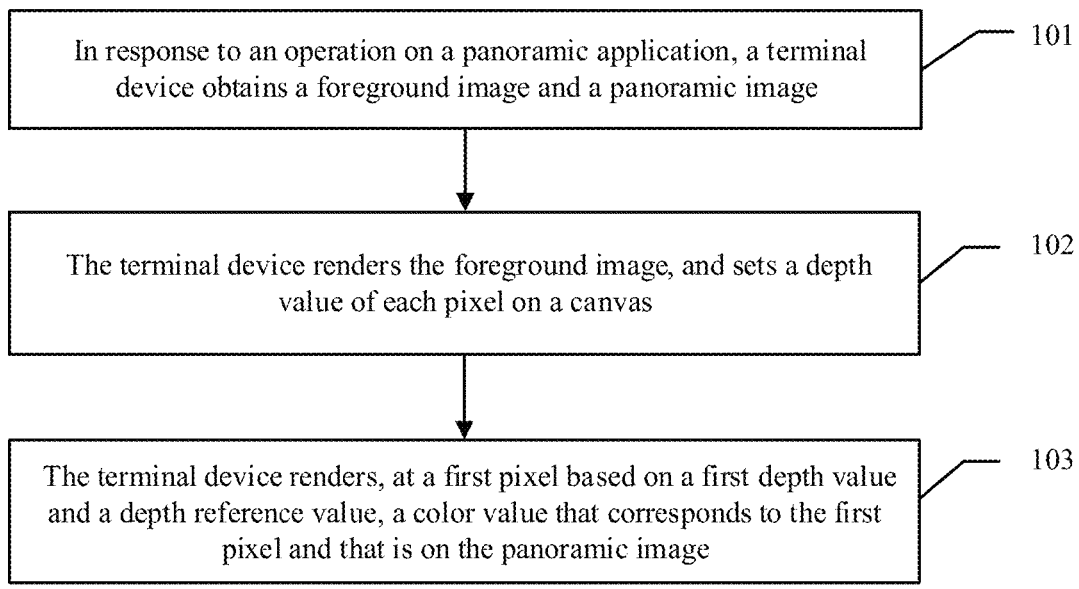
FIG. 2 is a schematic diagram of an embodiment of an image rendering method in a panoramic application according to an embodiment of this application.

FIG. 2 is a schematic diagram of an embodiment of an image rendering method in a panoramic application according to an embodiment of this application.

As shown in FIG. 2, an embodiment of the image rendering method in a panoramic application provided in this embodiment of this application may include the following steps.

101: In response to an operation on the panoramic application, a terminal device obtains a foreground image and a panoramic image.

The panoramic image is a background image of the foreground image.

The foreground image may be a person, a ground mark, or another image different from the background image. The background image may alternatively be a non-panoramic image, and a size of the background image is greater than a size of the foreground image. When the background image is a non-panoramic image, in a rendering process of superimposing the foreground image, an implementation principle and step are basically the same as those of the panoramic image in this application, and a perspective selection may not be performed.

102: The terminal device renders the foreground image, and sets a depth value of each pixel on a canvas.

The depth value of each pixel includes a first depth value and a depth reference value. The first depth value is a depth value of a pixel corresponding to the foreground image, the depth reference value is a depth value of a pixel other than the pixel corresponding to the foreground image, and the canvas is an area that is on a screen of the terminal device and that is used to display the panoramic image and the foreground image.

For a canvas, a quantity of pixels on the canvas is fixed. Pixels on the canvas may be considered as a pixel set A, a set of pixels occupied by the foreground image may be described as a subset B, and a set of pixels remaining after the subset B is removed may be described as a subset C. The pixels of the subset B and the pixels of the subset C do not overlap, and subset B+subset C=set A.

For ease of description, the "first depth value" represents the depth value of the pixel corresponding to the foreground image, the depth reference value is a reference value, and the first depth value and the depth reference value are separately used to represent different statuses of a pixel. The first depth value is used to indicate that the corresponding pixel does not need to be repeatedly rendered, and the depth reference value indicates that the corresponding pixel is not rendered. The first depth value may be represented by a specific numerical value, for example, −0.5, and the depth reference value may be represented by 0, or certainly, other numerical values may be used. In addition, the first depth value and the depth reference value in this application are not limited to numerical values, and may be other characters that can indicate whether pixels need to be rendered. For example, T indicates that repeated rendering is not required, and F indicates that the pixel is not rendered. Certainly, other characters may also be used for representation, as long as an indication is clear. The depth value does not represent a specific physical concept. Another name may be used for description, as long as it can describe whether a pixel can be rendered based on the panoramic image.

If the depth reference value is 0, it may alternatively be understood as that an operation of clearing a depth value of a pixel on the canvas is performed each time before the foreground image is rendered, and then the first depth value of the foreground image is written into a corresponding pixel of the foreground image when the foreground image is rendered. If the depth reference value is not 0, it may alternatively be understood as that a unified assignment operation is performed on the depth value of the pixel on the canvas each time before the foreground image is rendered, the depth value of the pixel on the canvas is first assigned the depth reference value, and then when the foreground image is rendered, the depth reference value is modified to the first depth value at the corresponding pixel of the foreground image.

103: The terminal device renders, at a first pixel based on the first depth value and the depth reference value, a color value that corresponds to the first pixel and that is on the panoramic image.

The first pixel is a pixel corresponding to the depth reference value.

In the solution provided in this embodiment of this application, the foreground image is first rendered, and then corresponding content of the panoramic image is rendered for a pixel that is not occupied by the foreground image. In this way, repeated rendering is avoided for an overlapping part between the foreground image and the panoramic image, which not only reduces resource wastes and rendering overheads, but also improves rendering efficiency.

Step 103 may be implemented by using two solutions, which are separately described in the following.

Solution 1: This solution is implemented by identifying the first depth value and the depth reference value.

After rendering of the foreground image is completed, the panoramic image begins to be rendered. The panoramic image may be rendered in a pixel-by-pixel rendering manner, and a rendered pixel may be represented by "a second pixel".

During pixel-by-pixel rendering, if a depth value of a second pixel is the first depth value, a color value that corresponds to the second pixel and that is on the panoramic image is stopped from being rendered at the second pixel, where the second pixel is any pixel on the canvas. If the depth value of the second pixel is the depth reference value, the color value that corresponds to the second pixel and that is on the panoramic image is rendered at the second pixel.

If the depth value of the second pixel is the first depth value, it indicates that the second pixel is already occupied by the foreground image, and rendering does not need to be repeated. Then, rendering of the second pixel is stopped. If the depth value of the second pixel is the depth reference value, it indicates that the second pixel is not occupied by the foreground image. Then, rendering is performed based on content that is of the panoramic image and that corresponds to the second pixel.

For example, if the first depth value is −0.5, the depth reference value is 0, and the depth value of the second pixel is −0.5, it indicates that the second pixel is already occupied by the foreground image, and rendering does not need to be repeated. Then, rendering of the second pixel is stopped. If the depth value of the second pixel is 0, it indicates that the second pixel is not occupied by the foreground image. Then, rendering is performed based on content that is of the panoramic image and that corresponds to the second pixel.

In this way, the first depth value and the depth reference value indicate whether a pixel needs to be rendered, which may ensure that a pixel occupied by the foreground image is not to be repeatedly rendered based on the panoramic image, ensuring rendering accuracy.

Solution 2: This solution is implemented by comparing the depth value of the second pixel with a second depth value.

The "second depth value" represents a depth value of the panoramic image, and the first depth value is relative to the second depth value. Because the panoramic image is the background image of the foreground image, the second depth value is greater than the first depth value. Both the first depth value and the second depth value are less than the depth reference value, and the first depth value, the second depth value, and the depth reference value are usually preconfigured. The panoramic image may be rendered in a pixel-by-pixel rendering manner, and a rendered pixel may be represented by "a second pixel".

During pixel-by-pixel rendering, if a depth value of a second pixel is less than the second depth value, a color value that corresponds to the second pixel and that is on the panoramic image is stopped from being rendered at the second pixel, where the second depth value is greater than the first depth value and less than the depth reference value, and the second pixel is any pixel on the canvas. If the depth value of the second pixel is greater than the second depth value, the color value that corresponds to the second pixel and that is on the panoramic image is rendered at the second pixel.

If the depth value of the second pixel is less than the second depth value, it indicates that the second pixel is already occupied by the foreground image, and rendering does not need to be repeated. Then, rendering of the second pixel is stopped. If the depth value of the second pixel is greater than the second depth value, it indicates that the second pixel is not occupied by the foreground image. Then, rendering is performed based on content that is of the panoramic image and that corresponds to the second pixel.

For example, if the first depth value is −0.5, the depth reference value is 0, and the second depth value is −0.2, if the depth value of the second pixel is less than −0.2, it indicates that the depth value of the second pixel is −0.5, which indicates that the second pixel is already occupied by the foreground image, and rendering does not need to be repeated. Then, rendering of the second pixel is stopped. If the depth value of the second pixel is greater than −0.2, it indicates that the depth value of the second pixel is 0, which indicates that the second pixel is not occupied by the foreground image. Then, rendering is performed based on content that is of the panoramic image and that corresponds to the second pixel.

In this way, the first depth value, the depth reference value, and the second depth value are compared to determine whether the second pixel needs to be rendered, which may ensure that a pixel occupied by the foreground image is not to be repeatedly rendered based on the panoramic image, ensuring rendering accuracy.

A rendering process is usually completed by a graphics processing unit (graphics processing unit, GPU). The GPU includes a vertex shader (vertex shader) and a fragment shader (fragment shader). The vertex shader is usually configured to locate a pixel, and the fragment shader is configured to color, that is, to write a color value into a color buffer. The second depth value is configured in the vertex shader. The second depth value may be compared with the depth value of the second pixel when the pixel is located, to determine whether the second pixel needs to be rendered based on the panoramic image.

To be specific, the second depth value, such as −0.2, may be written into a script of the vertex shader, so that the vertex shader can compare −0.2 with −0.5 or −0.2 with 0 when locating a pixel, thereby determining whether the second pixel needs to be rendered. If rendering is required, the fragment shader performs writing of a color value.

Step 102 may be implemented by using the following embodiment: detecting a transparency value of an alpha channel of the pixel corresponding to the foreground image, where the transparency value is used to indicate a transparency degree of the pixel; and if the transparency value is not 0, writing a color value of the foreground image into a first location in a color buffer, and writing the first depth value into a second location in a depth buffer, where the first location is a location of a pixel that corresponds to the foreground image and that is in the color buffer, and the second location is a location of a pixel that corresponds to the foreground image and that is in the depth buffer.

If the transparency value is 0, an operation of writing the color value into the color buffer is stopped.

In this possible embodiment, a display buffer (frame buffer) related to rendering may be divided into a color buffer and a depth buffer. The color buffer is used to buffer a color value of a pixel on the canvas, and the depth buffer is used to buffer a depth value of the pixel on the canvas, for example, buffer the first depth value, the depth reference value, or the second depth value. Each pixel has an alpha channel. The alpha channel has 256 levels of color values ranging from 0 to 255, where 0 indicates that a transparency value is 0. To be specific, the pixel needs to remain transparent in the foreground image and does not need to be rendered. Other non-zero transparency values ranging from 1 to 255 indicate that rendering needs to be performed based on a color value of the foreground image.

When the foreground image is rendered, a depth value of a pixel in the depth buffer is the depth reference value. If a transparency value is 0, it indicates that the pixel needs to remain transparent in the foreground image. In this case, the panoramic image needs to be used for filling, and the depth value of the pixel in the depth buffer does not need to be modified. If the transparency value is not 0, it indicates that the pixel needs to be filled by a color in the foreground image, and the panoramic image does not need to be used for filling. In this case, the depth value of the pixel in the depth buffer needs to be modified from the depth reference value to the first depth value, for example, modified from 0 to −0.5.

If the transparency value is 0, it indicates that the color value does not need to be written into the color buffer, and color value writing is usually performed by the fragment shader. In this case, when the transparency value is 0, only the fragment shader needs to be stopped from writing the color value of the pixel.

The image rendering method in a panoramic application provided in this embodiment of this application further includes: obtaining a rendering location of the foreground image in response to a location selection operation on the foreground image; and determining, based on the rendering location, the pixel corresponding to the foreground image.

In this embodiment of this application, a user may flexibly place an overlapping location of the foreground image in the panoramic image based on a requirement. After the user selects a location, a terminal device determines, based on the location selected by the user, a pixel that corresponds to the foreground image and that is on the canvas. Then, rendering is performed. In this way, rendering efficiency is improved.

The foregoing describes the image rendering method in a panoramic application from an overall perspective of the terminal device. The following describes, from a perspective of a module, a process of invoking the panoramic application to a GPU to perform rendering and display.

Figure 3:
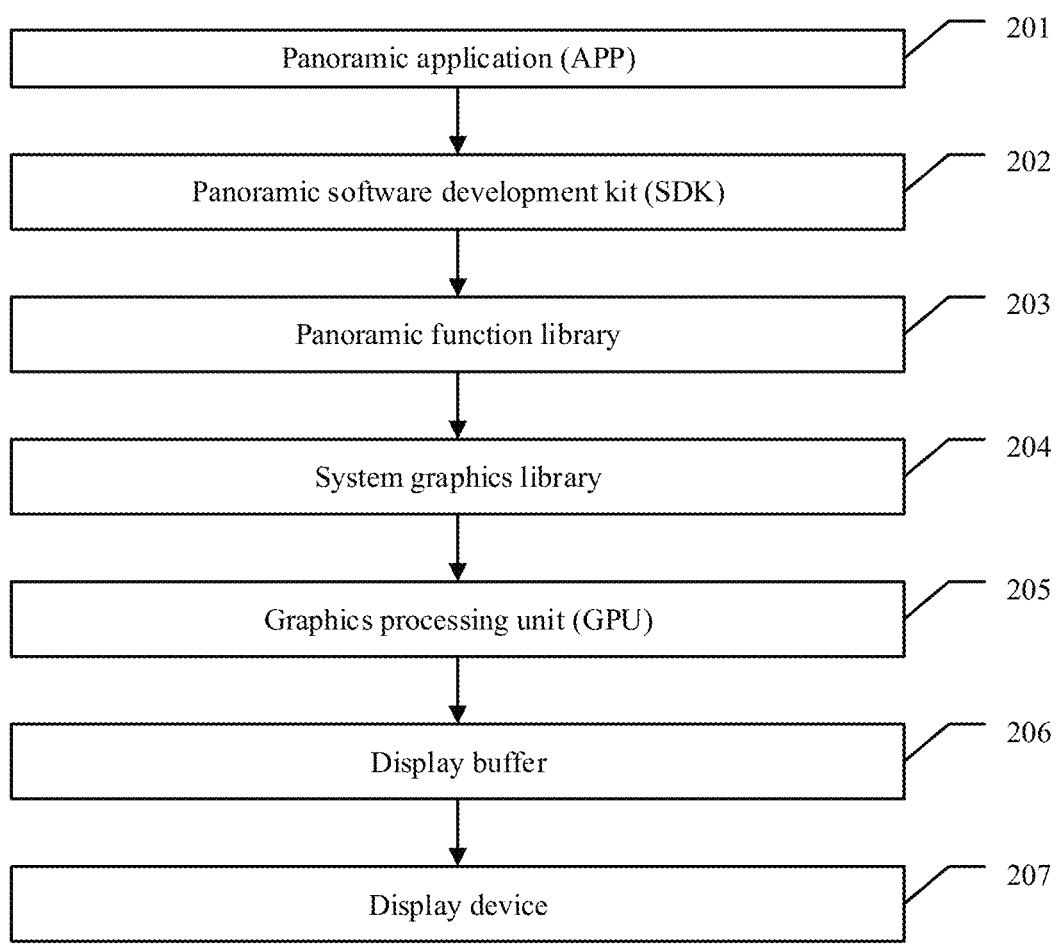
FIG. 3 is a schematic diagram of another embodiment of an image rendering method in a panoramic application according to an embodiment of this application.

FIG. 3 is a schematic flowchart of a rendering process according to an embodiment of this application.

As shown in FIG. 3, the rendering process relates to a panoramic application (APP) 201, a panoramic (Panorama) software development kit (software development kit, SDK) 202, a panoramic function library 203, a system graphics library 204, a graphics processing unit (GPU) 205, a display buffer 206, and a display device 207. The panoramic application 201 is used to interact with a user. The panoramic SDK 202 is equivalent to an interface, and the interface may be connected to the panoramic function library 203. The panoramic function library 203 may include a superimposition algorithm for a foreground image and a panoramic image. The superimposition algorithm may include clearing a depth value and a color value in the display buffer, performing depth value identification, and rendering the foreground image and the panoramic image based on the depth value. The panoramic function library 203 includes the algorithm. A specific process may be that the panoramic function library 203 invokes the system graphics library 204 to write the depth value and the color value into the display buffer 206 by using the GPU 205, and displays, by using the display device 207, a rendered result obtained after superimposition.

Figure 4A:
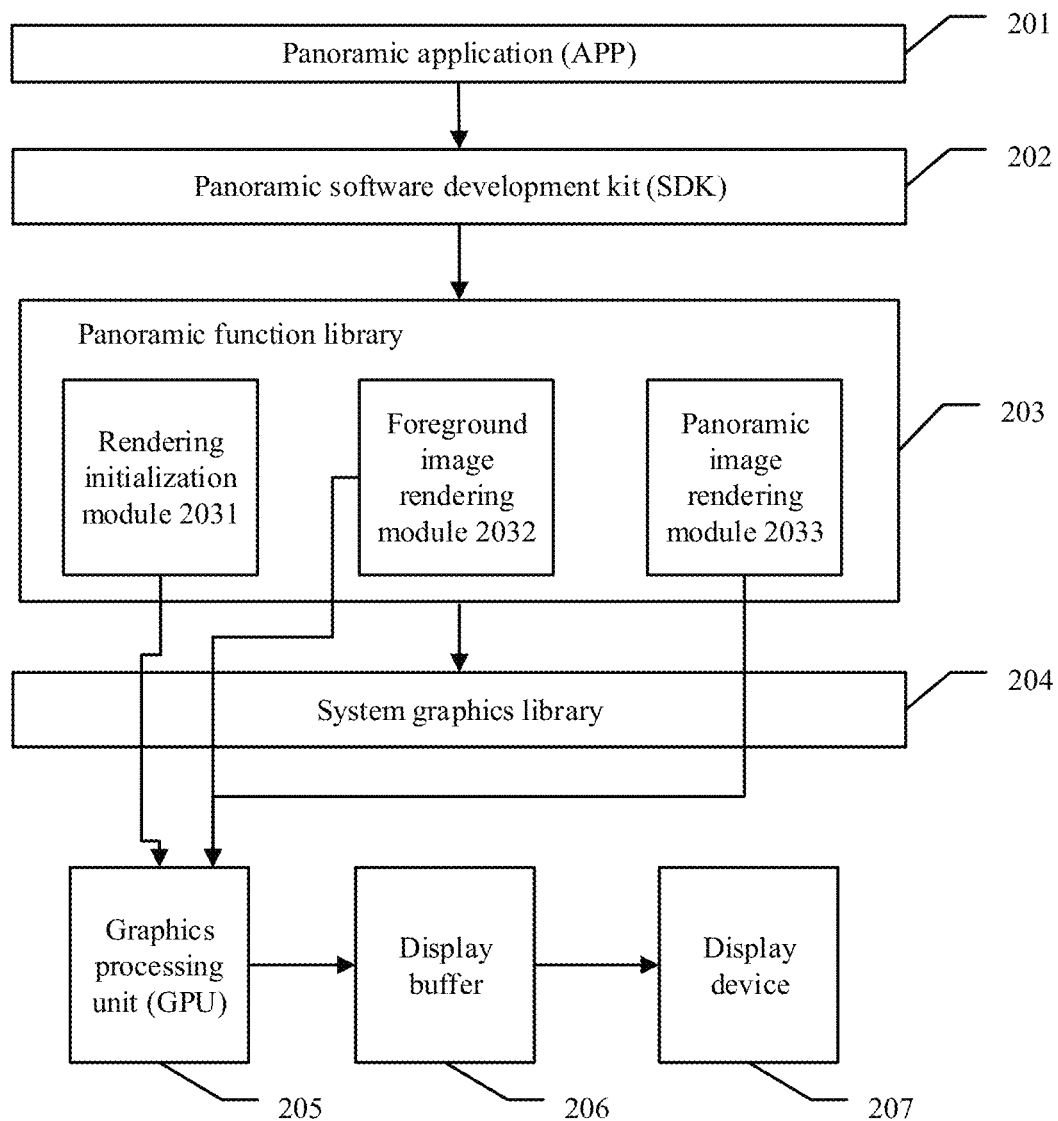
FIG. 4A is a schematic diagram of another embodiment of an image rendering method in a panoramic application according to an embodiment of this application.

As shown in FIG. 4A, the panoramic function library 203 in FIG. 3 may include a rendering initialization module 2031, a foreground image rendering module 2032, and a panoramic image rendering module 2033.

In a process shown in FIG. 4A, the panoramic application 201 invokes the panoramic SDK 202 to implement a specific panoramic application function, for example, implement street scene viewing and implement a real-time video background replacement function. The panoramic function library 203 is a dynamic library deployed on a terminal device to perform a function of displaying a panoramic image. The panoramic function library 203 includes the rendering initialization module 2031, the foreground image rendering module 2032, and the panoramic image rendering module 2033. When rendering a frame of image, the panoramic application invokes the three modules at a time to complete clearing of the display buffer, then renders a foreground image, and then renders a panoramic image that serves as a background to complete superimposition of a frame of panoramic image. The panoramic function library 203 invokes the system graphics library 204 to operate the GPU 205. Each operation is recorded in the display buffer 206, and then a system periodically displays content in the display buffer 206 on the display device 207, to complete a result obtained after the panoramic image and the foreground image are superimposed.

The display buffer 206 may include a color buffer and a depth buffer. Before the foreground image is rendered, the rendering initialization module 2031 may clear a color value in the color buffer and a depth value in the depth buffer, to avoid interference caused by a previous result to current rendering.

Figure 4B:
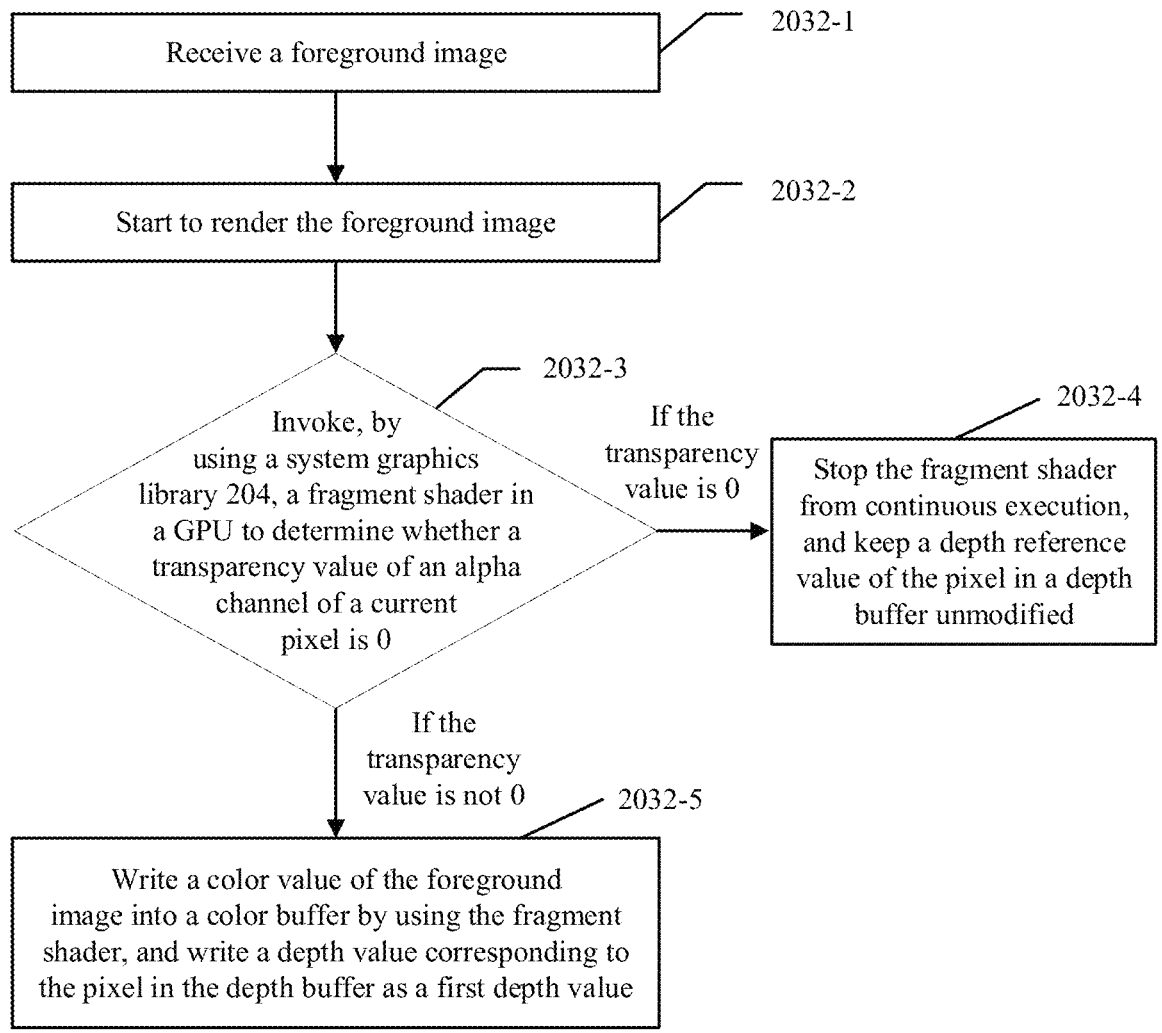
FIG. 4B is a schematic diagram of another embodiment of an image rendering method in a panoramic application according to an embodiment of this application.

In combination with the foregoing modules, a process of rendering the foreground image may include: transferring, by the panoramic application 201, the foreground image to the panoramic function library 203 by using an interface of the panoramic SDK 202. The foreground image rendering module 2032 may invoke, by using the system graphics library 204, a fragment shader in the GPU to determine whether a transparency value of an alpha channel of a current pixel (for a pixel to be rendered, refer to the foregoing second pixel) is 0. If the transparency value is 0, it indicates that the current pixel is transparent, and the fragment shader needs to be stopped from continuous execution, to keep a depth reference value (for example, 0) of the pixel in the depth buffer unmodified. If it is determined that the transparency value of the alpha channel of the current pixel is not 0, it indicates that the pixel has a color. In this case, a color value of the foreground image is written into the color buffer, and a depth value corresponding to the pixel is written as a first depth value (for example, −0.5). In this way, the color value of the foreground image has been stored at a corresponding location in the display buffer, and a depth buffer value of a non-transparent part is set to −0.5. A logic in the foreground image rendering module 2032 may include the following steps shown in FIG. 4B.

2032-1: The foreground image rendering module 2032 receives a foreground image.

2032-2: The foreground image rendering module 2032 starts to render the foreground image.

2032-3: The foreground image rendering module 2032 may invoke, by using the system graphics library 204, the fragment shader in the GPU to determine whether a transparency value of an alpha channel of a current pixel is 0; and if the transparency value is 0, perform step 2032-4; or if the transparency value is not 0, perform step 2032-5.

2032-4: If the transparency value is 0, the foreground image rendering module 2032 stops the fragment shader from continuous execution, and the foreground image rendering module 2032 keeps a depth reference value of the pixel in the depth buffer unmodified.

2032-5: If the transparency value of the alpha channel of the current pixel is not 0, the foreground image rendering module 2032 writes a color value of the foreground image into the color buffer by using the fragment shader, and writes a depth value that corresponds to the pixel and that is in the depth buffer as the first depth value.

After rendering of the foreground image is completed, the panoramic image begins to be rendered.

Figure 4C:
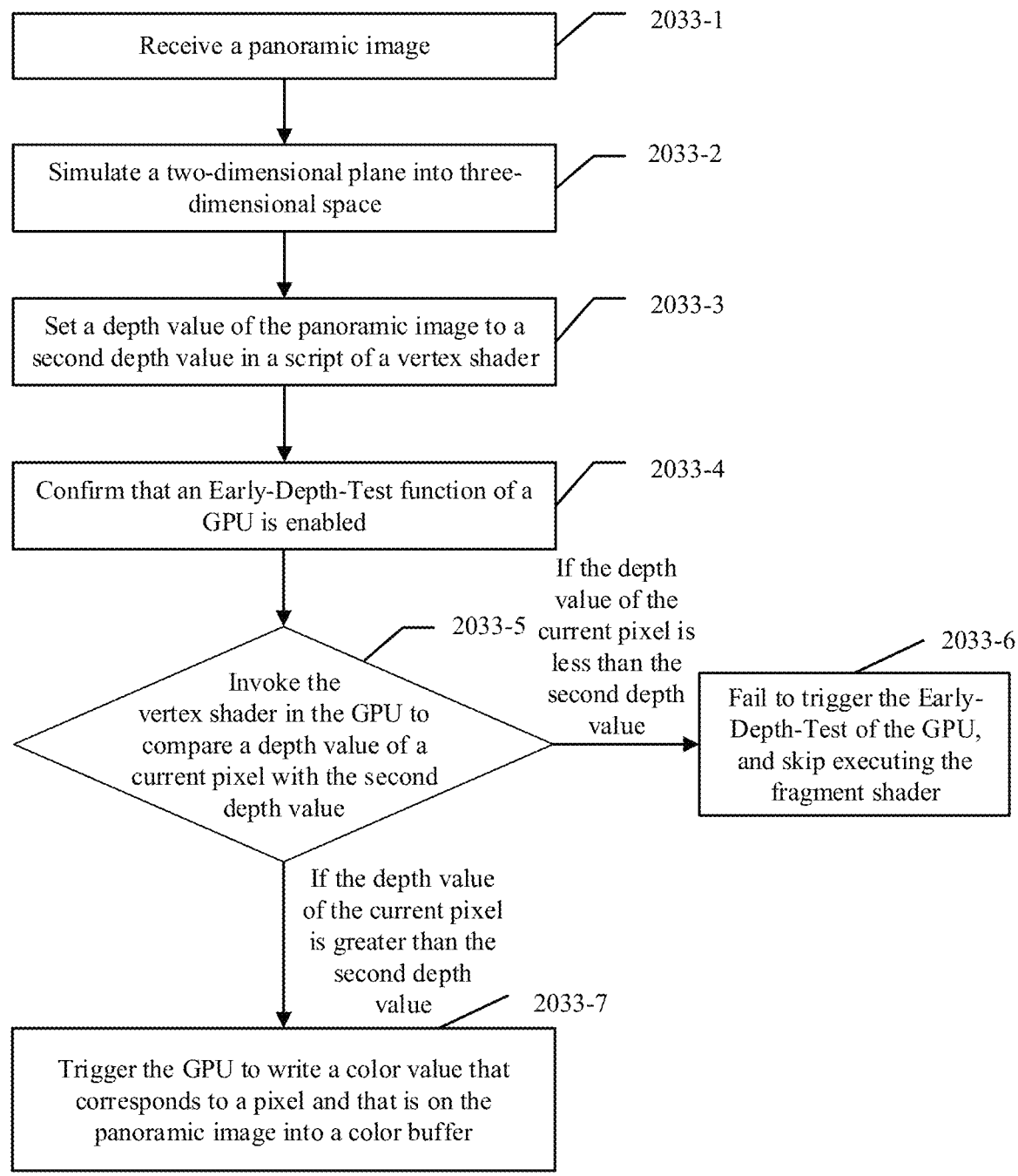
FIG. 4C is a schematic diagram of another embodiment of an image rendering method in a panoramic application according to an embodiment of this application.

The panoramic image rendering module 2033 receives the panoramic image transferred by the panoramic application 201 by using the interface of the panoramic SDK 202, and the panoramic image rendering module 2033 invokes a vertex shader in the GPU by using the system graphics library 204 to perform rendering. A depth value of the panoramic image is set to −0.2 in a script of the vertex shader. Early-Depth-Test of the GPU is in an enabled state, and the GPU calculates a depth value of a current pixel (refer to the foregoing second pixel). If a depth value of the foreground image is less than the depth value of the pixel in the depth buffer, it indicates that a color of the foreground image is not rendered at the pixel in the depth buffer. The GPU writes a color value of a corresponding pixel in the panoramic image into the color buffer. If the depth value of the current pixel is greater than the depth value of the pixel in the depth buffer, (for example, −0.2>−0.5), the Early-Depth-Test of the GPU fails, and the fragment shader is not to be executed, to keep the color value of the corresponding pixel in the color buffer and the depth value in the depth buffer unmodified. A logic in the panoramic image rendering module 2033 may include the following steps shown in FIG. 4C.

2033-1: The panoramic image rendering module 2033 receives a panoramic image.

2033-2: The panoramic image rendering module 2033 simulates a two-dimensional plane into three-dimensional space.

2033-3: The panoramic image rendering module 2033 sets a depth value of the panoramic image to a second depth value in the script of the vertex shader.

2033-4: The panoramic image rendering module 2033 confirms that an Early-Depth-Test function of the GPU is enabled.

If the Early-Depth-Test function is disabled, the Early-Depth-Test function of the GPU is triggered to be enabled.

2033-5: The panoramic image rendering module 2033 invokes the vertex shader in the GPU to compare a depth value of a current pixel with the second depth value; and if the depth value of the current pixel is less than the second depth value, performs step 2033-6; or if the depth value of the current pixel is greater than the second depth value, performs step 2033-7.

2033-6: If the depth value of the current pixel is less than the second depth value, the panoramic image rendering module 2033 fails to trigger the Early-Depth-Test of the GPU, and skips executing the fragment shader.

2033-7: If the depth value of the current pixel is greater than the second depth value, the panoramic image rendering module 2033 triggers the GPU to write a color value that corresponds to a pixel and that is on the panoramic image into the color buffer.

Figure 5:
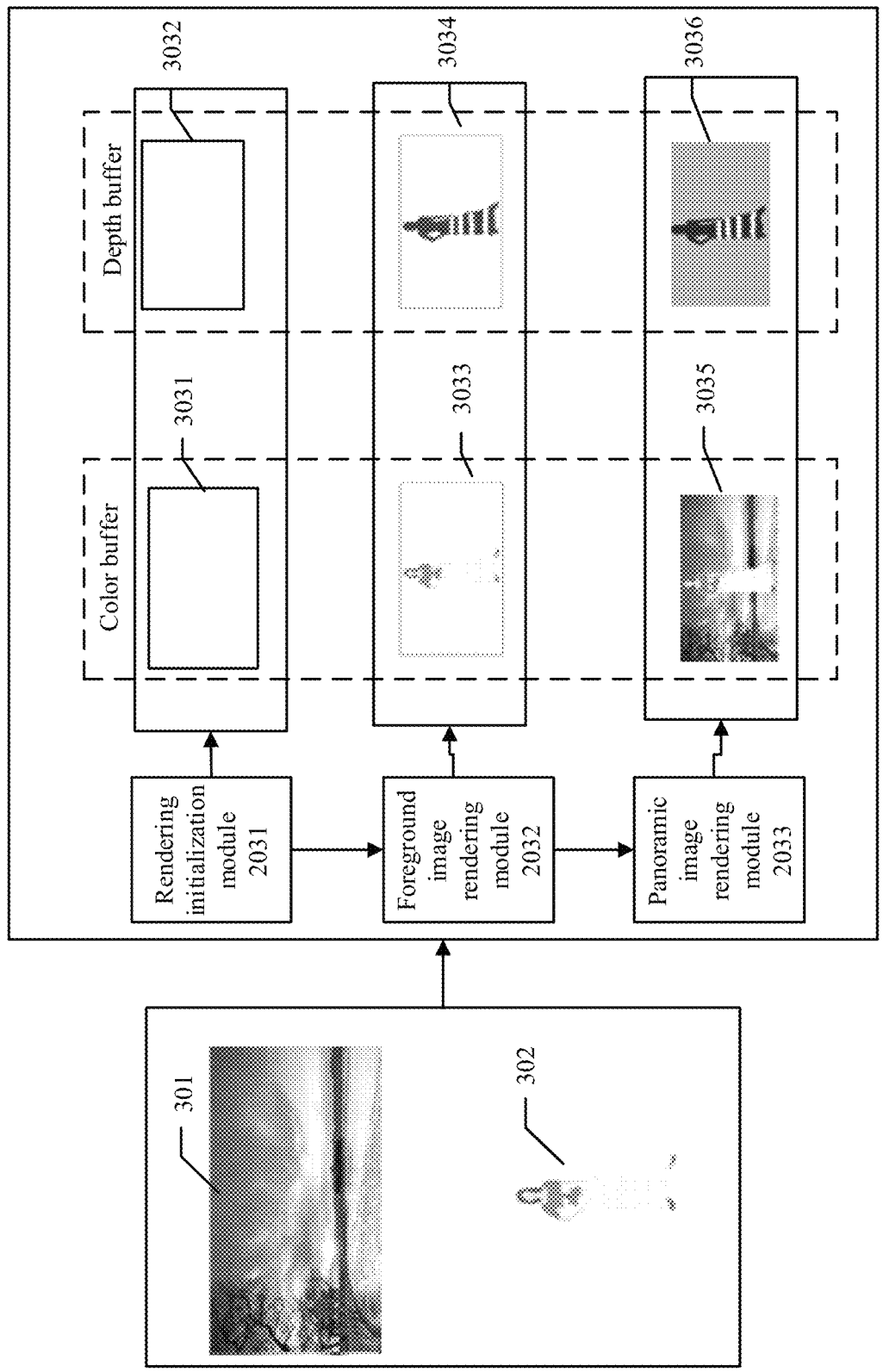
FIG. 5 is a schematic diagram of a scenario of image rendering in a panoramic application according to an embodiment of this application.

The following describes superimposition and rendering processes with reference to a video stream background replacement application. An AI image matting technology may be used to extract a person image from a video as a foreground image. A 360-degree panoramic image is used as a background image, and the panoramic image is merged with the person image used as the foreground image. For the rendering process in this embodiment of this application, refer to FIG. 5 for understanding. As shown in FIG. 5, a component structural diagram of this embodiment mainly includes a panoramic image 301 and a person image 302 whose background is removed and that is used as the foreground image.

The rendering initialization module 2031 clears both the color buffer and the depth buffer. For details about a condition in which the color buffer and the depth buffer are cleared, refer to 3031 and 3032 for understanding.

The foreground image rendering module 2032 renders the person image 302 input by a user into the display buffer based on a location specified by the user, and modifies a depth value of a pixel to the first depth value (for example, −0.5) at a location that corresponds to the person image and that is in the depth buffer. With reference to this scenario, after the person image 302 is rendered, the condition in which the color buffer and the depth buffer are cleared may be understood by referring to 3033 and 3034.

The panoramic image rendering module 2033 continues a process of rendering the panoramic image after rendering of the foreground image is completed. After the previous step is completed, a value of each of all pixels in the depth buffer becomes the depth reference value (for example, 0) or the first depth value (for example, −0.5). When the panoramic image is rendered, a calculated depth calculation result is set to the second depth value (for example, −0.2) in the vertex shader. With reference to this scenario, after the panoramic image 301 is rendered, the condition in which the color buffer and the depth buffer are cleared may be understood by referring to 3035 and 3036.

In this embodiment of this application, the foreground image is first rendered, so that the foreground image blocks the panoramic image by using a depth value. Due to the Early-Depth-Test function of the GPU, the GPU automatically optimizes and discards rendering of a pixel whose depth value is greater than a depth value in the depth buffer. Compared with repeated rendering of a superimposed area, in the solution provided in this embodiment of this application, one less foreground image is rendered. In this way, repeated rendering is avoided, which not only reduces resource wastes and rendering overheads, but also improves rendering efficiency.

In the foregoing example, only one foreground image is used as an example for description. Two or more foreground images may be superimposed on one panoramic image. Regardless of a quantity of foreground images, a rendering principle is the same as a principle described in the foregoing embodiment. If two or more foreground images that are used as panoramic images overlap, different depth values may be assigned based on an arrangement of the two or more foreground images. During rendering, a foreground image with a minimum depth value is first rendered, and then other foreground images are rendered in a sequence of depth values. The rendering principle is the same as the rendering principle in the foregoing embodiment.

The foregoing describes the image rendering method in a panoramic application. The following describes, with reference to accompanying drawings, a terminal device provided in embodiments of this application.

Figure 6:
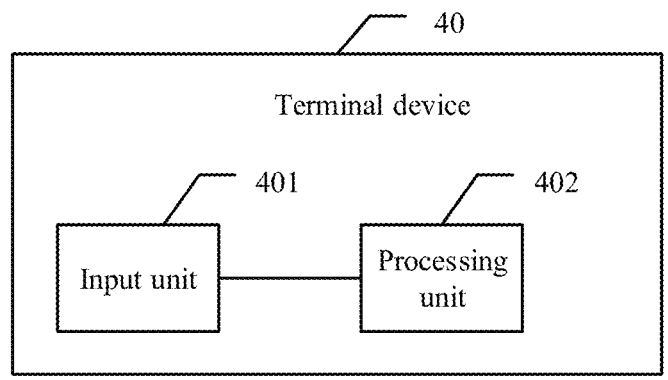
FIG. 6 is a schematic diagram of a structure of a terminal device according to an embodiment of this application.

As shown in FIG. 6, an embodiment of a terminal device 40 provided in an embodiment of this application includes:
an input unit 401, configured to respond to an operation on the panoramic application; and
a processing unit 402, configured to:
obtain a foreground image and a panoramic image, where the panoramic image is a background image of the foreground image;
render the foreground image, and set a depth value of each pixel on a canvas, where the depth value of each pixel comprises a first depth value and a depth reference value, the first depth value is a depth value of a pixel corresponding to the foreground image, the depth reference value is a depth value of a pixel other than the pixel corresponding to the foreground image, and the canvas is an area that is on a screen of the terminal device and that is used to display the panoramic image and the foreground image; and
render, at a first pixel based on the first depth value and the depth reference value, a color value that corresponds to the first pixel and that is on the panoramic image, where the first pixel is a pixel corresponding to the depth reference value.

In the solution provided in this embodiment of this application, one less foreground image is rendered. In this way, repeated rendering is avoided, which not only reduces resource wastes and rendering overheads, but also improves rendering efficiency.

In a possible embodiment, the processing unit 402 is configured to:
if a depth value of a second pixel is the first depth value, stop rendering, at the second pixel, a color value that corresponds to the second pixel and that is on the panoramic image, where the second pixel is any pixel on the canvas; and
if the depth value of the second pixel is the depth reference value, render, at the second pixel, the color value that corresponds to the second pixel and that is on the panoramic image.

In a possible embodiment, the processing unit 402 is configured to:
if a depth value of a second pixel is less than a second depth value, stop rendering, at the second pixel, a color value that corresponds to the second pixel and that is on the panoramic image, where the second depth value is greater than the first depth value and less than the depth reference value, and the second pixel is any pixel on the canvas; and
if the depth value of the second pixel is greater than the second depth value, render, at the second pixel, the color value that corresponds to the second pixel and that is on the panoramic image.

In a possible embodiment, the processing unit 402 is further configured to:
compare the depth value of the second pixel with the second depth value by using a vertex shader, where the second depth value is configured in the vertex shader.

In a possible embodiment, the processing unit 402 is configured to:
detect a transparency value of an alpha channel of the pixel corresponding to the foreground image, where the transparency value is used to indicate a transparency degree of the pixel; and
if the transparency value is not 0, write a color value of the foreground image into a first location in a color buffer, and write the first depth value into a second location in a depth buffer, where the first location is a location of a pixel that corresponds to the foreground image and that is in the color buffer, and the second location is a location of a pixel that corresponds to the foreground image and that is in the depth buffer.

In a possible embodiment, the processing unit 402 is further configured to:
if the transparency value is 0, stop an operation of writing the color value into the color buffer.

In a possible embodiment, the processing unit 402 is configured to:
write the first depth value into the second location in the depth buffer by using a fragment shader, where the first depth value is configured in the fragment shader.

In a possible embodiment, the processing unit 402 is further configured to:
obtain a rendering location of the foreground image in response to a location selection operation on the foreground image; and
determine, based on the rendering location, the pixel corresponding to the foreground image.

It should be noted that, because content such as information exchange and an execution process between units of the terminal device 40 is based on a same concept as that of the method embodiment of this application, technical effects brought by the content such as information exchange and the execution process are the same as those brought by the method embodiment of the present application. For specific content, refer to the description in the method embodiment shown in this application. Details are not described herein again.

Figure 7:
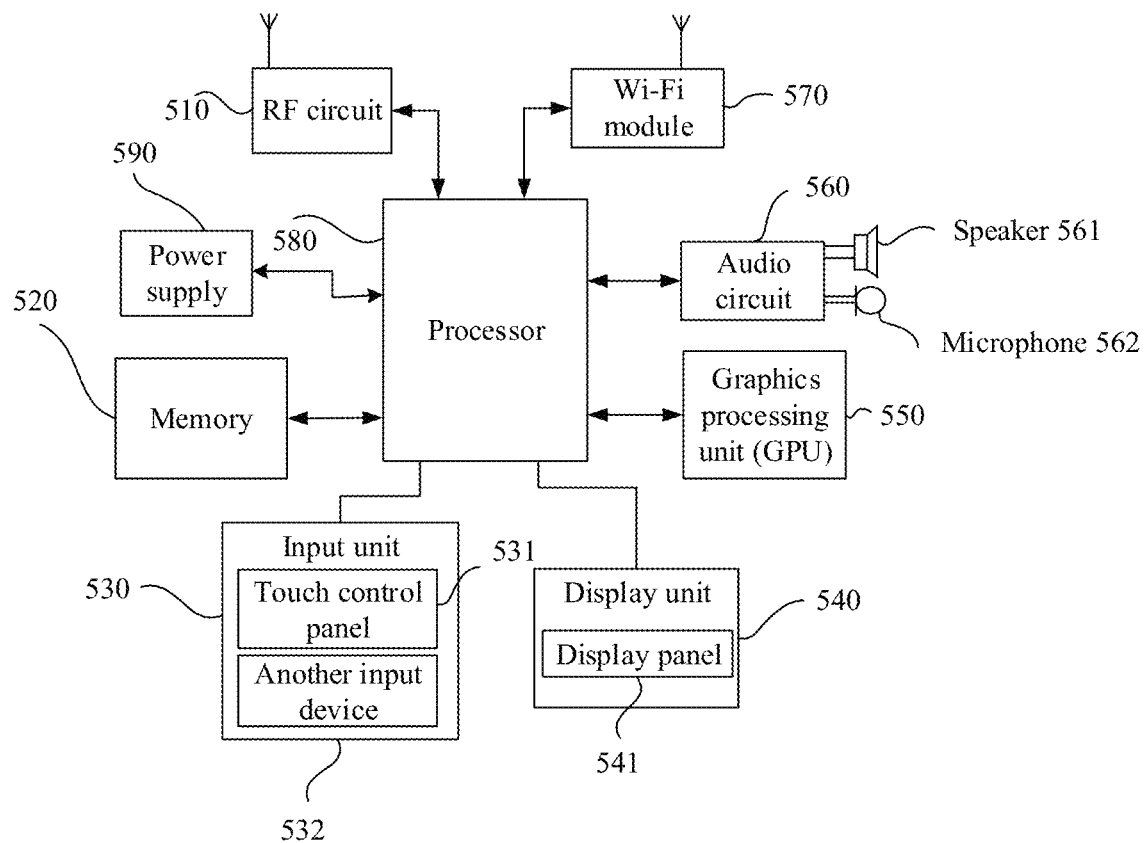
FIG. 7 is a schematic diagram of another structure of a terminal device according to an embodiment of this application.

FIG. 7 is a block diagram of a partial structure of a mobile phone related to the terminal according to this embodiment of this application. Referring to FIG. 7, the mobile phone includes components such as a radio frequency (Radio Frequency, RF) circuit 510, a memory 520, an input unit 530, a display unit 540, a graphics processing unit (GPU) 550, an audio circuit 560, a wireless fidelity (wireless fidelity, WiFi) module 570, a processor 580, and a power supply 590. A person skilled in the art may understand that the structure of the mobile phone shown in FIG. 7 does not constitute a limitation on the mobile phone, and the mobile phone may include more or fewer components than those shown in the figure, or combine some components, or have a different component arrangement.

The following describes the components of the mobile phone in detail with reference to FIG. 7.

The RF circuit 510 may be configured to receive and send a signal in an information receiving and sending process or a call process. In particular, after receiving downlink information from a base station, the RF circuit 510 sends the downlink information to the processor 580 for processing, and sends designed uplink data to the base station. The RF circuit 510 usually includes but is not limited to an antenna, at least one amplifier, a transceiver, a coupler, a low noise amplifier (Low Noise Amplifier, LNA), a duplexer, and the like. In addition, the RF circuit 510 may further communicate with a network and another device by using wireless communication. Any communications standard or protocol may be used for the wireless communication, including but not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, and a short message service (Short Messaging Service, SMS).

The memory 520 may be configured to store a software program and a module. The processor 580 runs the software program and the module stored in the memory 520 to perform various function applications of the mobile phone and data processing. The memory 520 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone, and the like. In addition, the memory 520 may include a high-speed random access memory, and may further include a nonvolatile memory, for example, at least one magnetic disk storage device, a flash storage device, or another volatile solid-state storage device.

The input unit 530 may be configured to receive a user operation instruction, and generate key signal input related to user setting and function control of the mobile phone. Specifically, the input unit 530 may include a touch control panel 531 and another input device 532. The touch control panel 531, also referred to as a touchscreen, may collect a touch operation (for example, an operation performed by a user on the touch control panel 531 or near the touch control panel 531 by using any proper object or accessory such as a finger or a tablet pen) performed by a user on or near the touch control panel 531, and drive a corresponding connection apparatus based on a preset program. Optionally, the touch control panel 531 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, and converts the touch information into coordinates of a touch point. Then the touch controller sends the coordinates of the touch point to the processor 580, and can receive and execute a command sent by the processor 580. In addition, the touch control panel 531 may be implemented in a plurality of types, such as a resistive type, a capacitive type, an infrared type, and a surface acoustic wave type. In addition to the touch control panel 531, the input unit 530 may further include the another input device 532. Specifically, the another input device 532 may include but is not limited to one or more of a physical keyboard, a function key (for example, a volume control press key or a power on/off press key), a trackball, a mouse, a joystick, and the like.

The display unit 540 may be configured to display a superposition result of a foreground image and a panoramic image. The display unit 540 may include a display panel 541. Optionally, and the display panel 541 may be configured in a form of a liquid crystal display (Liquid Crystal Display, LCD), an organic light-emitting diode (Organic Light-Emitting Diode, OLED), and the like. Further, the touch control panel 531 may cover the display panel 541. When detecting a touch operation on or near the touch control panel 531, the touch control panel 531 transmits the touch operation to the processor 580 to determine a type of a touch event. Then the processor 580 provides, based on the type of the touch event, corresponding visual output on the display panel 541. In FIG. 7, the touch control panel 531 and the display panel 541 are used as two independent parts to implement input and input functions of the mobile phone. However, in some embodiments, the touch control panel 531 and the display panel 541 may be integrated to implement the input and output functions of the mobile phone.

The mobile phone may further include at least one sensor, for example, a light sensor, a motion sensor, and another sensor. Specifically, the optical sensor may include an ambient light sensor and a proximity sensor. The ambient light sensor may adjust brightness of the display panel 541 according to brightness of ambient light, and the proximity sensor may close the display panel 541 and/or backlight when the mobile phone moves to an ear. As a type of motion sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein again.

The graphics processing unit (GPU) 550 is configured to perform corresponding steps in the foregoing embodiment of the image rendering method in a panoramic application, for example, steps 101, 102, and 103, and steps such as clearing the color buffer and the depth buffer, rendering the foreground image, rendering the panoramic image, and the like.

The audio circuit 560, a speaker 561, and a microphone 562 may provide an audio interface between the user and the mobile phone. The audio circuit 560 may convert received audio data into an electrical signal and then transmit the electrical signal to the speaker 561, and the speaker 561 converts the electrical signal into a sound signal for output. In addition, the microphone 562 converts a collected sound signal into an electrical signal. The audio circuit 560 receives the electrical signal, converts the electrical signal into audio data, and then outputs the audio data to the processor 580 for processing, to send, through the RF circuit 510, the audio data to, for example, another mobile phone, or outputs the audio data to the memory 520 for further processing.

Wi-Fi is a short-distance wireless transmission technology. With the Wi-Fi module 570, the mobile phone may help the user send and receive an email message, browse a web page, gain access to streaming media, and the like. The Wi-Fi module 570 provides wireless access to a broadband internet for the user. Although FIG. 7 shows the Wi-Fi module 570, it may be understood that the Wi-Fi module is not an integral component of the mobile phone, and may be omitted as required as long as the scope of the essence of the present application is not changed.

The processor 580 is a control center of the mobile phone. The processor 580 connects each part of the entire mobile phone through various interfaces and lines. In addition, the processor 580 runs or executes the software program and/or the module that are/is stored in the memory 520 and invokes data stored in the memory 520 to perform various functions of the mobile phone and data processing, so as to perform overall monitoring on the mobile phone. Optionally, the processor 580 may include one or more processing units. Preferably, an application processor and a modem processor may be integrated in the processor 580. The application processor mainly processes an operating system, a user interface, an application program, and the like. The modem processor mainly processes wireless communication. It may be understood that the modem processor may alternatively not be integrated into the processor 580.

The mobile phone further includes the power supply 590 (such as a battery) for supplying power to the components. Preferably, the power supply may be logically connected to the processor 580 by using a power management system, thereby implementing functions such as charging, discharging and power consumption management by using the power management system.

Although not shown, the mobile phone may further include a camera, a Bluetooth module, and the like. Details are not described herein.

This application further provides a chip system. The chip system includes a central processing unit and a GPU, and is configured to support the foregoing terminal device to implement functions related to the terminal device, for example, rendering a foreground image and rendering a panoramic image. In a possible design, the chip system further includes a memory. The memory is configured to store program instructions and data that are necessary for a computer device. The chip system may include a chip, or may include a chip and another discrete component.

All or a part of the foregoing embodiments may be implemented by using software, hardware, firmware, or any combination thereof. When the software is used to implement the embodiments, all or a part of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

Persons skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

In this application, "first", "second", "third" and the like are merely used for distinguishing between expressions, and do not have the meaning of limiting a sequence. In addition, a first object and a second object may, in some cases, refer to a same object. In addition, because there is no limited sequence, there may be no "first" but may be "second" or "third".

When the integrated unit is implemented in the form of a software functional unit and is sold or used as an independent product, the integrated unit may be stored in a computer-readable storage medium. Based on such an understanding, the technical solutions of this application essentially, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in this embodiment of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An image rendering method in a panoramic application, comprising:

in response to an operation on the panoramic application, obtaining a foreground image and a panoramic image, wherein the panoramic image is a background image of the foreground image;

rendering the foreground image, and setting a depth value of each pixel on a canvas, wherein the depth value of each pixel comprises a first depth value and a depth reference value, the first depth value is a depth value of a pixel corresponding to the foreground image, the depth reference value is a depth value of a pixel other than the pixel corresponding to the foreground image, and the canvas is an area that is on a screen of a terminal device and that is used to display the panoramic image and the foreground image; and rendering, at a first pixel based on the first depth value and the depth reference value, a color value that corresponds to the first pixel and that is on the panoramic image, wherein the first pixel is a pixel corresponding to the depth reference value.

2. The method according to claim 1, wherein the rendering, at a first pixel based on the first depth value and the depth reference value, a color value that corresponds to the first pixel and that is on the panoramic image comprises:

in response to determining that a depth value of a second pixel is the first depth value, stopping rendering, at the second pixel, a color value that corresponds to the second pixel and that is on the panoramic image, wherein the second pixel is any pixel on the canvas; and in response to determining that the depth value of the second pixel is the depth reference value, rendering, at the second pixel, the color value that corresponds to the second pixel and that is on the panoramic image.

3. The method according to claim 1, wherein the rendering, at a first pixel based on the first depth value and the depth reference value, a color value that corresponds to the first pixel and that is on the panoramic image comprises:

in response to determining that a depth value of a second pixel is less than a second depth value, stopping rendering, at the second pixel, a color value that corresponds to the second pixel and that is on the panoramic image, wherein the second depth value is greater than the first depth value and less than the depth reference value, and the second pixel is any pixel on the canvas; and in response to determining that the depth value of the second pixel is greater than the second depth value, rendering, at the second pixel, the color value that corresponds to the second pixel and that is on the panoramic image.

4. The method according to claim 3, wherein the method further comprises:

comparing the depth value of the second pixel with the second depth value by using a vertex shader, wherein the second depth value is configured in the vertex shader.

5. The method according to claim 1, wherein the rendering the foreground image, and setting a depth value of each pixel on a canvas comprises:

detecting a transparency value of an alpha channel of the pixel corresponding to the foreground image, wherein the transparency value indicates a transparency degree of the pixel corresponding to the foreground image; and in response to determining that the transparency value is a value other than 0, writing a color value of the foreground image into a first location in a color buffer, and writing the first depth value into a second location in a depth buffer, wherein the first location is a location of a pixel that corresponds to the foreground image and that is in the color buffer, and the second location is a location of a pixel that corresponds to the foreground image and that is in the depth buffer.

6. The method according to claim 5, wherein the method further comprises:

in response to determining that the transparency value is 0, stopping an operation of writing the color value into the color buffer.

7. The method according to claim 5, wherein the writing the first depth value into a second location in a depth buffer comprises:

writing the first depth value into the second location in the depth buffer by using a fragment shader, wherein the first depth value is configured in the fragment shader.

8. The method according to claim 1, wherein the method further comprises:

obtaining a rendering location of the foreground image in response to a location selection operation on the foreground image; and determining, based on the rendering location, the pixel corresponding to the foreground image.

9. A terminal device, comprising:

at least one processor; and one or more memories including programming instructions that, when executed by the at least one processor, cause the terminal device to:

in response to an operation on an panoramic application, obtain a foreground image and a panoramic image, wherein the panoramic image is a background image of the foreground image;

render the foreground image, and set a depth value of each pixel on a canvas, wherein the depth value of each pixel comprises a first depth value and a depth reference value, the first depth value is a depth value of a pixel corresponding to the foreground image, the depth reference value is a depth value of a pixel other than the pixel corresponding to the foreground image, and the canvas is an area that is on a screen of the terminal device and that is used to display the panoramic image and the foreground image; and render at a first pixel based on the first depth value and the depth reference value, a color value that corresponds to the first pixel and that is on the panoramic image, wherein the first pixel is a pixel corresponding to the depth reference value.

10. The terminal device according to claim 9, wherein the programming instructions, when executed by the at least one processor, further cause the terminal device to:

in response to determining that a depth value of a second pixel is the first depth value, stop rendering, at the second pixel, a color value that corresponds to the second pixel and that is on the panoramic image, wherein the second pixel is any pixel on the canvas; and in response to determining that the depth value of the second pixel is the depth reference value, render, at the second pixel, the color value that corresponds to the second pixel and that is on the panoramic image.

11. The terminal device according to claim 9, wherein the programming instructions, when executed by the at least one processor, further cause the terminal device to:

in response to determining that a depth value of a second pixel is less than a second depth value, stop rendering, at the second pixel, a color value that corresponds to the second pixel and that is on the panoramic image, wherein the second depth value is greater than the first depth value and less than the depth reference value, and the second pixel is any pixel on the canvas; and in response to determining that the depth value of the second pixel is greater than the second depth value, render, at the second pixel, the color value that corresponds to the second pixel and that is on the panoramic image.

12. The terminal device according to claim 11, wherein the programming instructions, when executed by the at least one processor, further cause the terminal device to:

compare the depth value of the second pixel with the second depth value by using a vertex shader, wherein the second depth value is configured in the vertex shader.

13. The terminal device according to claim 9, wherein the programming instructions, when executed by the at least one processor, further cause the terminal device to:

detect a transparency value of an alpha channel of the pixel corresponding to the foreground image, wherein the transparency value indicates a transparency degree of the pixel; and in response to determining that the transparency value is a value other than 0, write a color value of the foreground image into a first location in a color buffer, and write the first depth value into a second location in a depth buffer, wherein the first location is a location of a pixel that corresponds to the foreground image and that is in the color buffer, and the second location is a location of a pixel that corresponds to the foreground image and that is in the depth buffer.

14. The terminal device according to claim 13, wherein the programming instructions, when executed by the at least one processor, further cause the terminal device to:

in response to determining that the transparency value is 0, stop an operation of writing the color value into the color buffer.

15. The terminal device according to claim 13, wherein the programming instructions, when executed by the at least one processor, further cause the terminal device to:

write the first depth value into the second location in the depth buffer by using a fragment shader, wherein the first depth value is configured in the fragment shader.

16. The terminal device according to claim 9, wherein the programming instructions, when executed by the at least one processor, further cause the terminal device to:

obtain a rendering location of the foreground image in response to a location selection operation on the foreground image; and determine, based on the rendering location, the pixel corresponding to the foreground image.

17. A computer-readable storage medium storing programming instructions executable by at least one processor to cause the at least one processor to:

in response to an operation on an panoramic application, obtain a foreground image and a panoramic image, wherein the panoramic image is a background image of the foreground image;

render the foreground image, and set a depth value of each pixel on a canvas, wherein the depth value of each pixel comprises a first depth value and a depth reference value, the first depth value is a depth value of a pixel corresponding to the foreground image, the depth reference value is a depth value of a pixel other than the pixel corresponding to the foreground image, and the canvas is an area that is on a screen of a terminal device and that is used to display the panoramic image and the foreground image; and render, at a first pixel based on the first depth value and the depth reference value, a color value that corresponds to the first pixel and that is on the panoramic image, wherein the first pixel is a pixel corresponding to the depth reference value.

* * * * *

UNITED STATES PATENT AND TRADEMARK OFFICE
CERTIFICATE OF CORRECTION

PATENT NO. : 11,954,787 B2
APPLICATION NO. : 17/850170
DATED : April 9, 2024
INVENTOR(S) : Yixin Deng et al.

It is certified that error appears in the above-identified patent and that said Letters Patent is hereby corrected as shown below:

In the Claims

Column 22, Line 26, Claim 9, please delete "comprising:" and insert therefore -- comprising; --;

Column 22, Line 45, Claim 9, please delete "render" and insert therefore -- render, --.

Signed and Sealed this
Twentieth Day of August, 2024

Katherine Kelly Vidal
*Director of the United States Patent and Trademark Office*